(12) United States Patent
Fest (10) Patent No.: US 8,049,889 B2
(45) Date of Patent: Nov. 1, 2011

(54) SWITCHABLE IMAGING POLARIMETER AND METHOD

(75) Inventor: Eric C. Fest, Tucson, AZ (US)

(73) Assignee: Raytheon Company, Waltham, MA (US)

(*) Notice: Subject to any disclaimer, the term of this patent is extended or adjusted under 35 U.S.C. 154(b) by 440 days.

(21) Appl. No.: 12/332,653

(22) Filed: Dec. 11, 2008

(65) Prior Publication Data
US 2010/0149533 A1 Jun. 17, 2010

(51) Int. Cl.
*G01J 4/00* (2006.01)
*G02B 27/10* (2006.01)
*G02B 27/14* (2006.01)

(52) U.S. Cl. .................. 356/367; 359/627; 359/629
(58) Field of Classification Search .................. None
See application file for complete search history.

(56) References Cited

U.S. PATENT DOCUMENTS

| | | | |
|---|---|---|---|
| 5,526,184 A * | 6/1996 | Tokuhashi et al. ............ | 359/630 |
| RE37,752 E | 6/2002 | Wolff | |
| 6,917,427 B2 * | 7/2005 | Krause et al. ................. | 356/366 |
| 7,106,327 B2 | 9/2006 | Narasimhan et al. | |
| 7,379,247 B2 * | 5/2008 | Goto ............................. | 359/629 |
| 2002/0033903 A1 * | 3/2002 | Sato ............................. | 348/756 |
| 2007/0038040 A1 * | 2/2007 | Cense et al. .................. | 600/310 |
| 2007/0126991 A1 * | 6/2007 | Fujita et al. ................... | 353/81 |
| 2007/0223078 A1 * | 9/2007 | Yao et al. ...................... | 359/259 |

FOREIGN PATENT DOCUMENTS
GB 2 271 845 4/1994

OTHER PUBLICATIONS

Nathan J. Pust et al., "Dual-field imaging polarimeter using liquid crystal variable retarders," Applied Optics, vol. 45, No. 22, Aug. 1, 2006, pp. 5470-5478.
International Search Report and Written Opinion of corresponding International Application No. PCT/US2009/063512, dated Jan. 27, 2010.
International Preliminary Report on Patentability of corresponding International Application No. PCT/US2009/063512, dated Dec. 9, 2010.

* cited by examiner

*Primary Examiner* — Michael A Lyons
*Assistant Examiner* — Juan D Valentin
(74) *Attorney, Agent, or Firm* — Renner, Otto, Boisselle & Sklar, LLP (57) ABSTRACT

A polarimeter and method of polarizing incoming light includes an optical assembly, a first adjustable circular retarder that rotates the polarization content of incoming light, a polarization beam splitter that receives light from the adjustable circular retarder and polarizing the light into a first portion of light having a first polarization and a second portion of light having a second polarization. The first portion of light is directed to a focal plane and the second portion of light is directed to the optical assembly. The optical assembly is switchable between a polarizing mode of operation in which the first portion of light is viewable at the focal plane in absence of the second portion of light and an imaging mode of operation in which the first portion of light and the second portion of light are viewable at the focal plane.

24 Claims, 3 Drawing Sheets

SWITCHABLE IMAGING POLARIMETER AND METHOD

FIELD OF THE INVENTION

The application is in the field of optics, and more particularly to polarimeters.

DESCRIPTION OF THE RELATED ART

As light travels through the air it collides with millions of tiny particles. These collisions cause the light to scatter and become partially polarized. Sunlight scattered from these particles make objects and scenes behind the particles more difficult to see. The scattering and glare caused by these collisions increases with the number of particles suspended in the air. For example, the scattering from particles suspended in the air is particularly noticeable in areas having high levels of atmospheric dust, such as dry or arid climates (e.g. deserts) or areas that are frequently hazy from smog or other materials suspended in the air (e.g., cities or densely populated regions).

A polarimeter can be used to analyze the polarization content of the light and filter out light scattered by airborne particles using image processing functions. The processed image can then be used for other applications, such as locating a target, determining or extracting range information, distinguishing between man-made and natural objects, etc.

Some polarimeters utilize two or more linear polarizers to filter incoming light. The linear polarizers in these types of polarimeters filter at least half of the incoming light and direct the remaining light to a focal plane. Thus, the brightness of the image at the focal plane typically is reduced by about half. To allow the polarimeter to analyze the polarization content of the incoming light at every angle, the linear polarizers must be rotatable relative to one another.

Another type of polarimeter is a dual-beam polarimeter. Dual beam polarimeters split incoming light into two polarization states. The polarized light typically is sent to an array of detectors so that the light can be analyzed. The use of an array of detectors generally increases the cost of the polarimeter. Unlike linear polarizer polarimeters, dual beam polarimeters generally do not filter half of the incoming light, however, dual beam polarimeters typically have several moving parts. Furthermore, it is often difficult to combine the output of the two detectors due to differences in alignment, transmittance, and gain between the two detector paths.

Improvements over such polarimeters would generally be desirable.

SUMMARY OF THE INVENTION

To overcome at least the drawbacks of other polarimeters, the polarimeters described herein is operable in a first mode in which the polarimeter can be used to analyze the polarization of the incoming light, such as for use in hazy or dusty conditions when glare is high. In the first mode the incoming light is polarized to determine/analyze the polarization content and about half of the incoming light is lost. This loss of light may limit the usefulness of the polarimeter on clear days or when there is little atmospheric haze or dust. The polarimeter therefore is operable in a second mode as standard imager. In the second mode most of the light lost from polarization filtering is recaptured to produce an image that is brighter than the image produced in the first mode. As described in more detail below, the polarimeter may be electronically switched between operational modes without the use of moving parts.

According to an aspect of the invention, a polarimeter includes an adjustable circular retarder that receives incoming light through an entrance aperture and rotates the polarization of the incoming light, a polarization beam splitter that polarizes the light received from the adjustable circular retarder by splitting the light into a first portion of light having a first polarization and a second portion of light having a second polarization, wherein the first portion of light is reflected by the polarization beam splitter along a first path and the second portion of light is transmitted through the polarization beam splitter along a second path. The polarimeter has a first optical assembly that receives the first portion of light, rotates the polarization by substantially 90 degrees, and directs the first portion of light back to the polarization beam splitter along the first path such that the first portion of light is transmitted through the polarization beam splitter to a focal plane, and a second optical assembly that receives the second portion of light and selectively either (i) rotates the polarization by substantially 90 degrees and directs the second portion of light back to the polarization beam splitter along the second path such that the second portion of light with is reflected by the polarization beam splitter to the focal plane, or (ii) absorbs the second portion of light or reflects the second portion of light through the entrance aperture.

According to another aspect of the invention, the polarimeter includes an afocal telescope that directs the incoming light to the adjustable circular retarder.

According to yet another aspect of the invention, the first optical assembly includes a quarter-wave plate and a reflective element, wherein first portion of light passes through the wave plate to the reflective element, and the reflective element reflects the first portion of light back through the wave plate to the polarization beam splitter.

According to another aspect of the invention, the wave plate is a quarter wave plate.

According to a further aspect of the invention, the second optical assembly includes a second adjustable circular retarder and a linear polarizer, and the second portion of light passes through the second adjustable circular retarder which rotates the polarization of the second portion of light such that the linear polarizer absorbs the second portion of light.

According to another aspect of the invention, the second optical assembly includes a reflective element and the second portion of light passes through the second adjustable circular retarder which rotates the polarization of the second portion a first time so that the second portion of light is transmitted through the linear polarizer to the reflective element. The second portion of light is reflected by the reflective element back through the linear polarizer to the second adjustable circular retarder and the second adjustable circular retarder rotates the polarization of the second portion of light a second time.

According to another aspect of the invention, the linear polarizer is a 45-degree linear polarizer and the second adjustable circular retarder either rotates the polarization of the second portion of light by −45 degrees such that the second portion of light is absorbed by the linear polarizer or rotates the polarization content of second portion of light by +45 degrees such that the second portion of light is transmitted through the linear polarizer.

According to yet another aspect of the invention, the second adjustable circular retarder is switchable between a first mode in which the second portion of light is rotated to be transmitted back to the polarization beam splitter and a second mode in which the second portion of light is rotated to be absorbed by a linear polarizer.

According to another aspect of the invention, one of the first portion of light or the second portion of light is s-polarized light and the other of the first portion of light or the second portion of light is p-polarized light.

According to a further another aspect of the invention, the polarimeter further includes a focusing element that focuses the first portion of light and the second portion of light onto the focal plane.

According to another aspect of the invention, a method of polarizing light with a polarimeter includes receiving incoming light, rotating the incoming light with an adjustable circular retarder, polarizing the light with a polarization beam splitter by reflecting a first portion of light having a first polarization to a first optical assembly and transmitting a second portion of light having a second polarization through the polarization beam splitter to a second optical assembly, rotating the polarization of the first portion of light and reflecting the first portion of light back to the polarization beam splitter with the first optical assembly such that the first portion of light is transmitted through the polarization beam splitter and directed to a focal plane, and selectively operating the polarimeter in either (i) a first mode which comprises rotating the polarization of the second portion of light and reflecting the second portion of light back to the polarization beam splitter with the second optical assembly such that the second portion of light is reflected by the polarization beam splitter and directed to the focal plane, or (ii) a second mode which comprises absorbing the second portion of light with the second optical assembly.

According to another aspect, the method includes introducing a π phase delay to the light having the first polarization with the first optical assembly.

According to another aspect of the method, the introducing a π phase delay includes transmitting the first portion of light through a quarter-wave plate to change an original linear polarization of first portion of light to circular polarization, reflecting the light with the circular polarization off of a reflective element, and transmitting the light with the circular polarization through the quarter-wave plate a second time to change the polarization to a linear polarization with a phase delay of π from the original linear polarization.

According to yet another aspect of the invention, the first mode further includes rotating polarization of the second portion of light in a first direction by transmitting the light through a second adjustable circular retarder a first time, reflecting the first portion of light off of a reflective surface back to the second adjustable circular retarder, and rotating the second portion of light a second time in the first direction by transmitting the second portion of light through the second adjustable circular retarder a second time.

According to yet another aspect of the invention, the second mode further includes rotating the polarization second portion of light in a second direction by transmitting the second portion of light through the second adjustable circular retarder.

According to a further aspect of the invention, the first direction is orthogonal to the second direction.

According to yet another aspect of the invention, one of the first direction or the second direction is +45 degrees and the other of the first direction or the second direction is −45 degrees.

According to yet another aspect of the invention, the rotating of the second portion of light with the second adjustable circular retarder includes applying a first voltage to the second adjustable circular retarder to rotate the second portion of light in the first direction and applying a second voltage to the second adjustable circular retarder to rotate the second portion of light in the second direction.

According to another aspect of the invention, the selectively operating the polarimeter in the first mode and the second mode includes applying a first voltage to the second adjustable circular retarder to operate the polarimeter in the first mode and a second voltage to the second adjustable circular retarder to operate the polarimeter in the second mode.

According to yet another aspect of the invention, the intensity of the light directed to the focal plane is greater when the polarimeter is operating in the first mode than the intensity of light directed to the focal plane when the polarimeter is operating in the second mode.

According to another aspect, a switchable polarimeter includes an optical assembly, a first adjustable circular retarder that rotates the polarization content of incoming light, and a polarization beam splitter that receives light from the adjustable circular retarder and polarizes the light into light having a first polarization and light having a second polarization, wherein the light with the first polarization is directed to a focal plane and the light with the second polarization is directed to the optical assembly. The optical assembly is switchable between an imaging mode in which the light with the first polarization and the light with the second polarization are viewable at the focal plane, and a polarizing mode in which the light with the first polarization is viewable at the focal plane in absence of the light with the second polarization.

According to another aspect of the switchable polarimeter, the optical assembly is comprised of an adjustable circular retarder, a linear polarizer and a reflective element, wherein the light with the second polarization is passed through the adjustable circular retarder and is reflected off of the reflective element and back through the adjustable circular retarder to the polarization beam splitter, and wherein the adjustable circular retarder rotates the polarization content of the light to be reflected off of the mirror and to the focal plane in imaging mode and rotates the polarization content of the light to be absorbed by the linear polarizer in polarizing mode.

According to another aspect of the switchable polarimeter, the adjustable circular retarder rotates the polarization content of the light with the second polarization by +45 each time the light with the second polarization passes through the adjustable circular retarder in imaging mode and rotates the polarization content of the light with the second polarization by −45 degrees in polarizing mode.

According to yet another aspect of the invention, the intensity of light at the focal plane in imaging mode is greater than the intensity of light at the focal plane polarizing mode.

The foregoing and other features of the invention are hereinafter fully described and particularly pointed out in the claims, the following description and the annexed drawings setting forth in detail several illustrative embodiments of the invention, such being indicative, however, of but a few of the various ways in which the principles of the invention may be employed.

BRIEF DESCRIPTION OF THE DRAWINGS

In the annexed drawings, which are not necessarily to scale.

DETAILED DESCRIPTION

Figure 1:
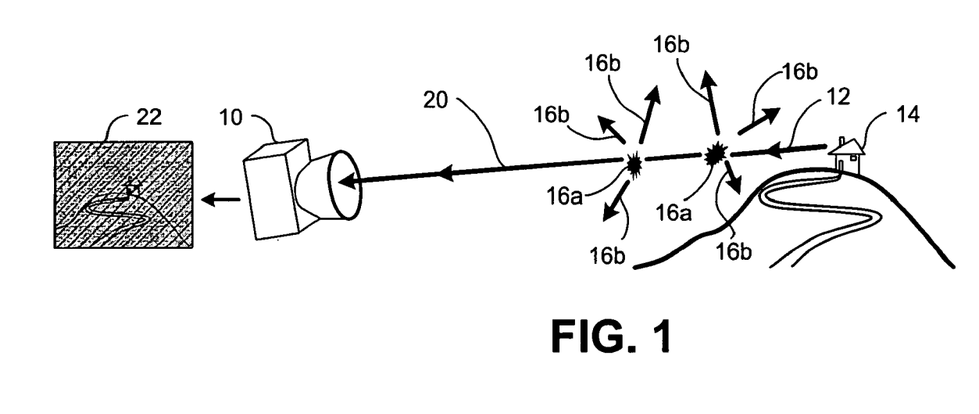
FIG. 1 is an exemplary embodiment of a polarimeter in a first operational state.
Figure 2:
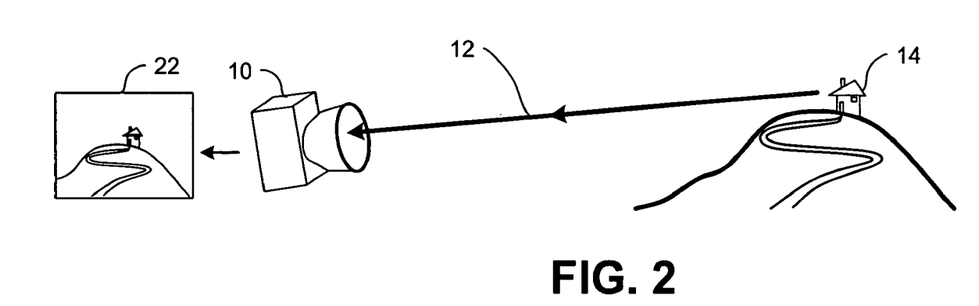
FIG. 2 is an exemplary embodiment of the polarimeter in a second operational state.

The polarimeters described herein are selectively operable in a first mode as a polarimeter and a second mode as a standard imager. The two operational modes are illustrated in FIGS. 1 and 2, respectively. Referring initially to FIG. 1, a polarimeter 10 is used to view light 12 from a scene 14 in the first operational state or mode (also referred to as a "polarimeter mode," "polarizing mode," or "on state"). As shown in FIG. 1, light 12 from the scene 14 is incident on dust or particles 16a that are suspended in the atmosphere. Some of the light that strikes the particles 16a is scattered, as indicated at 16b. The scattering 16b from the particles 16a may cause incoming light 20 to the polarimeter 10 to be partially polarized. As shown in FIG. 1, the light 12 incident on the particles 16a may be polarized in different directions due to scattering by the particles 16a. Although only two particles 16a are shown, it will be appreciated that the air between the scene 14 and the polarimeter 10 may contain millions of tiny particles, each of which may scatter and partial polarize the incoming light 20.

In polarimeter mode, the polarimeter 10 is used to determine, analyze, and/or evaluate the polarization content of the incoming light 20. As described in more detail below with respect to FIG. 3, the incoming light 20 is transmitted through a polarization beam splitter to polarize the light. The polarization beam splitter splits the light into a first portion and a second portion, each having a different polarization. In polarimeter mode, the first portion of light is directed to a focal plane 22 and the second portion of light is attenuated or absorbed.

Figure 3:
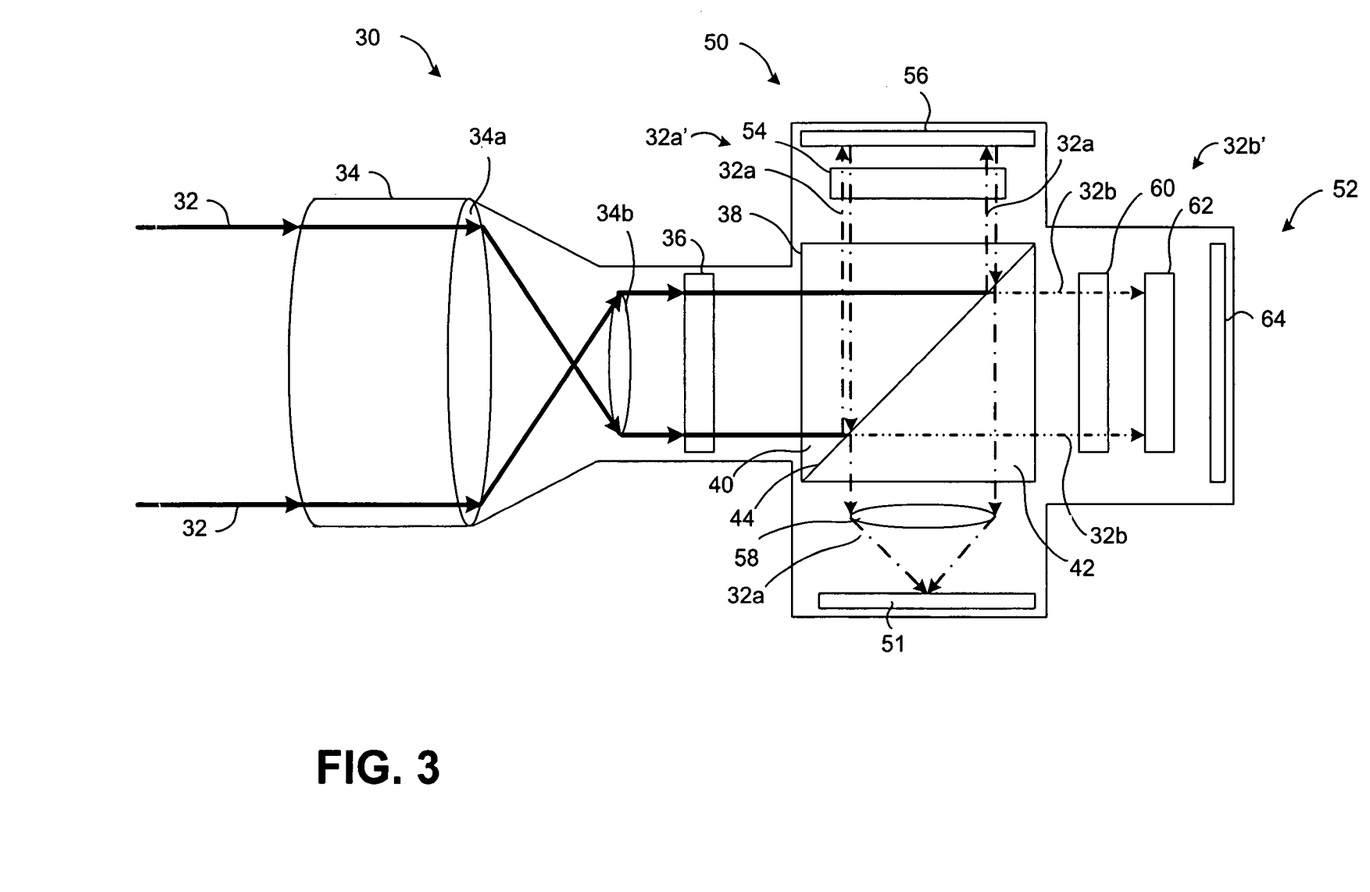
FIG. 3 is a schematic representation of an exemplary embodiment of the polarimeter in the first operational state.

The different planes of polarization of the incoming light 20 are analyzed by rotating the incoming light 20 with the adjustable circular retarder (as shown in FIG. 3). As described below, the adjustable circular retarder rotates the incoming light without the use of mechanical parts, thereby reducing the number of components that may break due to mechanical failure.

An exemplary representation of the light at the focal plane 22 when the polarimeter 10 is in polarimeter mode is shown in FIG. 1. In polarimeter mode, at least half of the incoming light is lost, and therefore the brightness of the light at the focal plane 22 is reduced. The reduction in brightness is indicated by the shading on the image of the focal plane 22. The reduction of the intensity of the light at the focal plane 22 may not be desirable when the polarimeter 10 is used to view an object that is far away or when there is good visibility (e.g., when there is not a significant amount atmospheric dust in the air). To increase the intensity of the light at the focal plane 22, the polarimeter 10 may be electronically switched from the polarimeter mode to the standard imaging mode.

An illustrative embodiment of the second operational state or second mode (also referred to as "standard imaging mode," "imaging mode," or "off state") is shown in FIG. 2. For purposes of illustration, there are no particles shown in the air of FIG. 2, however, it will be appreciated that in reality there may be millions of particles in the air that may scatter or cause partial polarization of the incoming light, but to a lesser degree than would occur in dusty or hazy environments.

In standard imaging mode, and as described in more detail below with respect to FIG. 4, rather than absorbing or attenuating the second portion of light from the polarization beam splitter, the second portion of light is directed to the focal plane 22. Thus, the light at the focal plane 22 in standard imaging mode is brighter than the light at the focal plane in polarimeter mode. The brighter image allows the polarimeter 10 to be used for imaging objects that are far away, when a polarized image is undesirable, or when there is little or no glare, etc.

Figure 4:
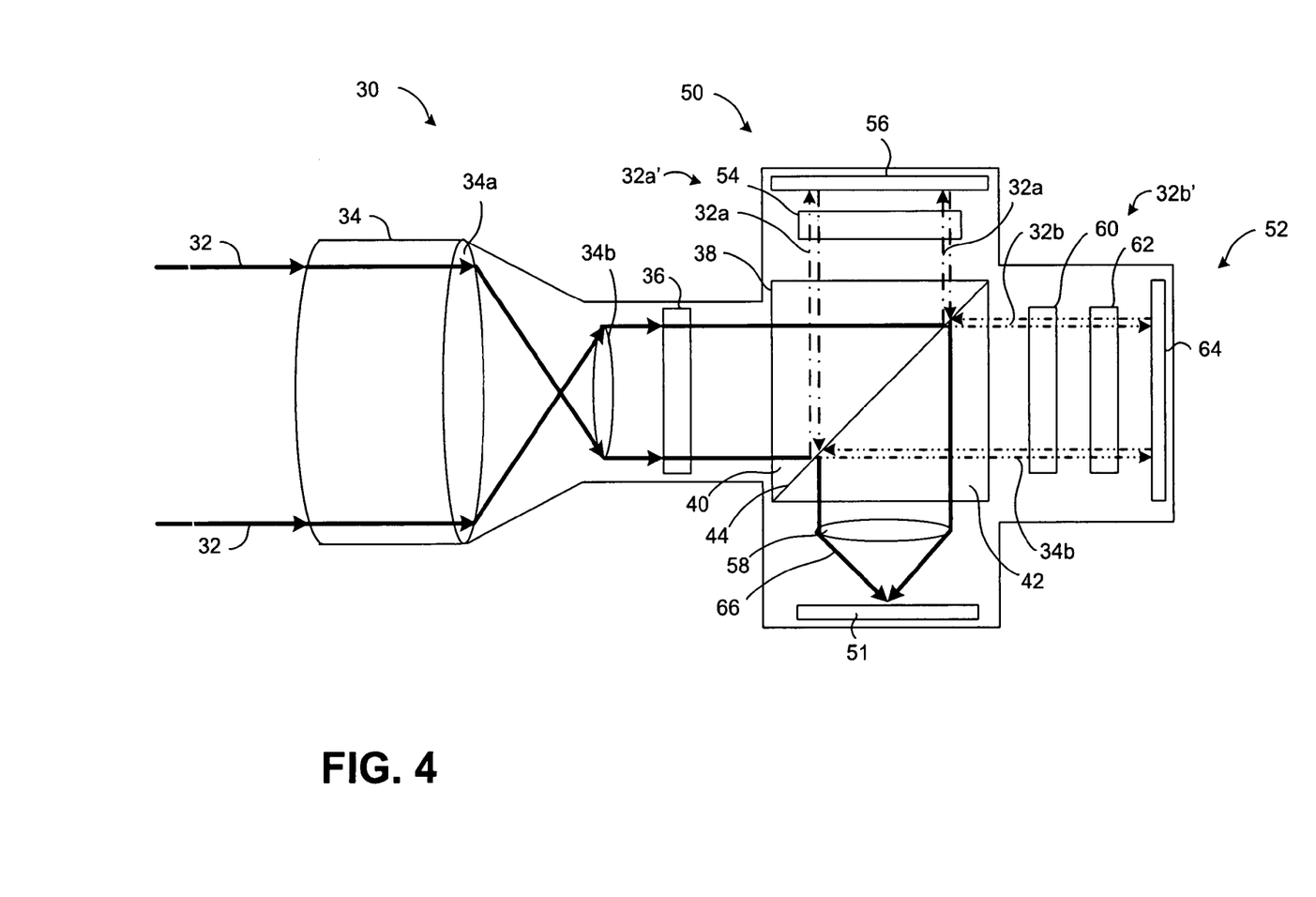
FIG. 4 is a schematic representation of an exemplary embodiment of the polarimeter in a second operational state.

Referring to FIGS. 3 and 4, a schematic view of an embodiment of the polarimeter 30 is shown. In FIG. 3 the polarimeter 30 is in the "on" state or polarizing mode, and in FIG. 4 the polarimeter 30 is in the "off" state or imaging mode.

Incoming light 32 is received by an afocal telescope 34. The afocal telescope 34 receives and magnifies the incoming light 32 by way of two elements 34a, 34b. The elements 34a, 34b may be lenses, mirrors, or a combination of lenses or mirrors. The magnified incoming light 32 is directed to an adjustable circular retarder 36 by the afocal telescope 34. As will be appreciated, the afocal telescope 34 may include more than two elements 34a, 34b. Also, it will be appreciated that the polarization state of the incoming light 32 may be changed by polarization aberrations in the afocal telescope 34. Thus, the afocal telescope should be designed to reduce or minimize the polarization aberrations to an acceptable level, e.g., such that the polarization state of the scene is not lost.

As described above, the incoming light 32 may be partially polarized in many directions due to the scattering caused by particles in the atmosphere. The polarization of the incoming light 32 may be in any of a number of different directions or planes, such as, for example the vertical plane, the horizontal plane, an angular plane, or a combination of multiple planes. An adjustable circular retarder 36 rotates the incoming light 32 so that the polarimeter 30 can analyze the polarization content of the incoming light 32 in each plane.

The adjustable circular retarder 36 includes an electro-optical element (not shown). The polarization content of the incoming light 32 is rotated by applying a voltage to the electro-optical element with an electronic controller. Different voltages may be applied to the adjustable circular retarder 36 to achieve different angles of rotation. For example, a first voltage may be applied to rotate the incoming light 32 by +45 degrees. A different voltage may be applied to rotate the incoming light 32 by +90 degrees, etc. Alternatively, the voltage applied to the electro-optical element may be varied at a constant rate to continually rotate the incoming light 32. By rotating the incoming light 32 either in increments or continuously, the adjustable circular retarder 36 allows the different polarization content of the incoming light to be analyzed without moving parts.

Although shown schematically in FIG. 3, the adjustable circular retarder 36 and the rotation of the incoming light 32 may be achieved in a number of ways, as will be appreciated by one of skill in the art. For example, the adjustable circular retarder 36 may be two quarter-wave plates and a liquid crystal display (LCD). Alternatively, the adjustable circular retarder 36 may be a Kerr cell or a Pockels cell. The adjustable circular retarder also may be a Faraday rotator.

After passing through the adjustable circular retarder 36, the incoming light 32 is transmitted to a polarization beam splitter 38. The polarization beam splitter 38 splits the incoming light 32 into a first portion of light 32a and a second portion of light 32b having a first polarization and second polarization, respectively. The plane of polarization of the first portion 32a and the plane of polarization of the second portion 32b are orthogonal to one another. The first portion of light 32a is reflected by the polarization beam splitter 38 and the second portion of light 32b that is transmitted through the polarization beam splitter 38. The polarization beam splitter 38, therefore, splits the incoming light 32 into orthogonal components based upon the polarization content.

For example, the first portion of light 32a, which is reflected by the polarization beam splitter 38, may be s-polarized light and the second portion of light 32b, which is transmitted through the polarization beam splitter 38, may be p-polarized light.

As will be appreciated, any of a number of different types of polarization beam splitters can be used to split the incoming light into a first portion having a first polarization and a second portion having a second polarization. In one embodiment, the polarization beam splitter 38 may be constructed with interference or thin-film filters. In another embodiment, the polarization beam splitter 38 can be a cube that includes two triangular prisms 40, 42 that are glued together with a layer of resin 44. The prisms 40, 42 are made from a birefringent material that splits the light based upon the polarization content of the light incident on the prisms 40, 42. More specifically, the polarization beam splitter 38 reflects the portion light 32a having a first polarization and transmits the portion of light 32b having the second polarization.

The first portion of light 32a is reflected by the polarization beam splitter 38 to a first optical assembly 50 along a first path 32a'. The first optical assembly 50 rotates the plane of polarization of the first portion of light 32a by substantially 90 degrees and returns the first portion of light 32a back to the polarization beam splitter 38 along the first path 32a'. By rotating the plane of polarization of the first portion of light 32a by substantially 90 degrees, the first portion of light 32a is transmitted through the polarization beam splitter 38. Thus, when the first portion of light 32a is returned from the first optical assembly 50 to the polarization beam splitter 38, it is transmitted through the polarization beam splitter 38 to the focal plane array (or FPA) 51 (also referred to as a focal plane).

The first optical assembly 50 includes a quarter-wave plate 54 and a reflective element 56 along the first path 32a'. The quarter-wave plate 54 is formed from a birefringent material, for example, such as calcite or quartz. The quarter-wave plate 54 shifts or delays the phase of the first portion of light 32a so that the first portion of light 32a, which is originally linearly polarized, becomes circularly polarized (e.g., the light 32a has a quarter-wave, or $\pi/2$, phase delay between orthogonal polarization components). After being reflected off of a reflective element 56, the light 32a is still circularly polarized, and after passing through the quarter-wave plate 54 a second time, the light 32a becomes linearly polarized with a phase delay of $\pi$ from the original linear polarization. This means that the orientation of linear polarization of the outgoing beam has been rotated by substantially 90 degrees from the orientation of the original linear polarization.

As will be appreciated, the reflective element 52 may be a mirror or other reflective surface that reflects incident light without substantially changing the properties of the light.

By rotating the plane of polarization of the first portion of light 32a by substantially 90 degrees, the light 32a returns to the polarization beam splitter 38 having the plane of polarization that is transmitted through the polarization beam splitter 38 (e.g., the plane of polarization of the first portion of light 32a is rotated to have the same plane of polarization as the second portion of light 32b that was transmitted through the polarization beam splitter 38). As a result, the first portion of light 32a from the first optical assembly 50 is transmitted through the polarization beam splitter 38 rather than being reflected by the polarization beam splitter 38. The transmitted light 32a is then directed to the focal plane 51 by way of a focusing element 58. The focusing element may be one or more lenses, or mirrors, or a combination of lenses and mirrors. Similar to the afocal telescope 34, the focusing element may cause polarization aberrations, and therefore, the focusing element 58 should be designed to reduce or minimize the polarization aberrations to an acceptable level, e.g., such that the polarization state of the scene is not lost.

The second portion of light 32b from the polarization beam splitter 38 is transmitted through the polarization beam splitter 38 along a second path 32b' to a second optical assembly 52. Based on the operational mode of the polarimeter 30, the second optical assembly 52 selectively either attenuates the second portion of light 32b (polarimeter mode) or directs the second portion of light 32b to the focal plane 51 (standard imaging mode).

In FIG. 3, the polarimeter 30 is operating in polarimeter mode. In polarimeter mode, the second optical assembly 52 is controlled to absorb or to attenuate the second portion of light 32b such that only the first portion of light 32a is directed to the focal plane 51. The light at the focal plane 51 therefore includes the first portion of light 32a in the absence of the second portion of light 32b.

The second optical assembly 52 includes an adjustable circular retarder 60, a linear polarizer 62, and a reflective element 64. In polarimeter mode, the adjustable circular retarder 60 rotates the plane of polarization of the second portion of light 32b to be absorbed by the linear polarizer 62. For example, if the linear polarizer 62 is a 45 degree linear polarizer, the plane of polarization of the second portion of light 32b will be rotated such that the plane of polarization of the second portion 32b is orthogonal to the orientation of the linear polarizer 62 (e.g., the plane of polarization of the second portion 32b will be rotated to −45 degrees or $-\pi/4$).

As described above, the incoming light may be polarized in a number of different planes. The planes of polarization of the first portion of light 32a and the second portion of light 32b are orthogonal to one another. Regardless of the polarization of the incoming light 32, the planes of polarization of the first portion 32a and the second portion 32b do not change. In polarimeter mode, only the light with the first polarization is directed to the focal plane 51. As a result, the intensity of the first portion of light 32a at the focal plane 51 may vary as the incoming light 32 is rotated through the plane of polarization of the first portion of light 32a by the adjustable circular retarder 36. The polarimeter is therefore able to analyze the different polarizations of the incoming light 32 at the focal plane 51.

The rotation of the incoming light 32 by the adjustable circular retarder 36 is controlled by application of a voltage to the electro-optical element in the adjustable circular retarder 36. As will be appreciated, the rotation of the plane of polarization is based upon the voltage applied to the adjustable circular retarder 36. By applying different voltages, the planes of polarization of the incoming light 32 can be rotated over 360 degrees. As a result, each of the various different planes of polarization of the incoming light 32 are reflected by the polarization beam splitter 38 to the first optical assembly 50 and to the focal plane 51, and the light having the corresponding orthogonal plane of polarization is directed to the second optical assembly 52, where it is absorbed or attenuated. Thus, each different plane of polarization of the incoming light 32 can be observed and analyzed at the focal plane 51 to determine the various different polarization components without the use of mechanical or moving parts.

In a simplified example, assume the incoming light 32 to the afocal telescope 34 is completely polarized in the p-direction, and the polarization beam splitter 38 is configured to split the incoming light 32 into a first portion 32a that is s-polarized light and a second portion 32b that is p-polarized light. The portion of the incoming light 32 that is polarized in the s-direction is reflected by the polarization beam splitter 38 and the portion of the incoming light 32 that is polarized in the p-direction is transmitted through the polarization beam splitter 38. Thus, any light that is reflected by the polarization beam splitter 38 (e.g., the first portion 32a) is in the s-polarized state and any light that is transmitted through the polarization beam splitter 38 is in the p-polarized state (e.g., the second portion 32b). Regardless of the different plane of polarization of the incoming light 32, the polarization beam splitter 38 always splits the light into the p-polarized state and the s-polarized state.

If no voltage is applied to the adjustable circular retarder 36, the incoming light 32 passes through the adjustable circular retarder 36 without being rotated. The incoming light 34 therefore enters the polarization beam splitter 38 as p-polarized light. The polarization beam splitter 38 splits the light into a first portion 32a that is s-polarized light and a second portion that is p-polarized light. Because the incoming light does not have an s-polarized portion, none of the light is reflected by the polarization beam splitter 38 to the first optical assembly 50, and all of the light is transmitted through the polarization beam splitter 38 to the second optical assembly 52.

As will be appreciated, the adjustable circular retarder 36 may be constructed such that the incoming light is rotated when no voltage is applied and such that the incoming light is not rotated when a voltage is applied.

The adjustable circular retarder 60 in the second optical assembly 52 rotates the plane of polarization of the second portion of light 32b to be absorbed by the linear polarizer 62. If the linear polarizer 62 is a 45 degree linear polarizer, then the plane of polarization of the p-polarized light is rotated by −45 degrees, and all of the light 32b that is transmitted to the second optical assembly 52 is absorbed or attenuated by the linear polarizer 62. Because the second portion 32b includes all of the incoming light 32, no light is transmitted to the focal plane 51.

Now assume that a voltage is applied to the adjustable circular retarder 36 to rotate the plane of polarization of the incoming light 32 by +45 degrees, such that the incoming light 32 is about half p-polarized light and about half s-polarized light. The polarization beam splitter 38 splits the light 32 into the s-polarized state and the p-polarized state, e.g., the first portion 32a is s-polarized light that is reflected by the polarization beam splitter 38 and the second portion 32b is p-polarized light that is transmitted by the polarization beam splitter 38. The s-polarized portion of the light 32a is reflected by the polarization beam splitter 38 to the first optical assembly 50, while the p-polarized portion of the light 32b is transmitted through the polarization beam splitter 38 to the second optical assembly 52. In polarimeter mode, the first portion of light 32a (e.g., the portion in the s-polarized state) is directed to the focal plane 51 and the second portion of light 32b (e.g., the portion in the p-polarized state) is attenuated by the linear polarizer 62. The light at the focal plane 51, therefore, includes only about half of the incoming light 32.

Now assume a different voltage is applied to the adjustable circular retarder 36 to rotate the plane of polarization of the incoming light 32 by 90 degrees, such that the plane of polarization of the incoming light 32 is rotated from the p-polarized state to the s-polarized state. The polarization beam splitter 38 still splits the light into the first portion 32a, which is s-polarized light and the second portion 32b, which is p-polarized light. Because the incoming light 32 is completely in the s-polarized state, all of the incoming light 32 is reflected by the polarization beam splitter 38 to the first optical assembly 50, and none of the light is transmitted through the polarization beam splitter 38 to the second optical assembly 52. As described above, the portion of light 32a that is reflected to the first optical assembly 50 is directed to the focal plane 51. The intensity of the light at the focal plane 51 when the incoming light 32 is rotated by +90 degrees is greater than the intensity of the light at the focal plane 51 when the light is rotated by +45 degrees.

By rotating the incoming light 32 in this manner, the polarization content of the incoming light 32 can be determined. In the above example, the light at the focal plane 51 would the brightest when the incoming light 32 is rotated +90 degrees by the adjustable circular retarder 38, indicating that by rotating the incoming light by +90 degrees, the greatest amount of the incoming light is put into the s-polarized state. Thus, it can be deduced or determined that the majority of the incoming light 32 is polarized in a direction that is +90 degrees (or orthogonal to) the s-polarized state. In this example, therefore, the polarimeter would determine that the incoming light 32 is primarily p-polarized light.

This simplified example is illustrative of how the polarimeter 30 determines the polarization state of the incoming light 32 and is by no means intended to be limiting in nature. For example, the incoming light may be partially polarized one or more directions and may be rotated by the adjustable circular retarder 36 in small increments to analyze many different planes of polarization of the incoming light 32. Furthermore, it will be appreciated by one of skill in the art that a computer or other automated system may be used to determine the polarization content.

In instances where the user of the polarimeter would like to remain hidden, such as military applications, it is desirable to attenuate or to absorb the second portion of light 32b. Thus, as described above, the second optical assembly 52 includes a linear polarizer 62 to absorb the second portion of light 32b. As will be appreciated, in other applications, it may not be necessary to remain hidden. In such instances, a linear polarizer 62 may not be necessary and the second portion of light 32b may be reflected off of the reflective element 64, back through the polarization beam splitter 38 and out of the afocal telescope 32.

Referring now to FIG. 4, the polarimeter 30 also is operable in standard imaging mode. In the standard imaging mode, the second optical assembly 52 is controlled to rotate the plane of polarization of the second portion of light 32b, such that the second portion 32b is transmitted through the linear polarizer 62 and back to the polarization beam splitter 38. After being rotated by substantially 90 degrees, the second portion of light 32b is transmitted back to the polarization beam splitter 38 along the second path 32b' where it is reflected by the polarization beam splitter 38 to the focal plane 51. At focal plane 51, the second portion 32b is combined with the first portion of light 32a to form a combined portion of light 66.

The plane of polarization of the second portion of light 32b is rotated by 45 degrees (or π/4) each time the light passes though the adjustable circular retarder 60. The plane of polarization of the second portion of light 32b is therefore rotated by substantially 90 degrees when it is directed from the second optical assembly 52 and back to the polarization beam splitter 38.

For example, as described above, the first portion of light 32a that is reflected by the polarization beam splitter 38 may be s-polarized light and the second portion of light 32b that is transmitted through the polarization beam splitter may be p-polarized light. The voltage applied to the adjustable circular retarder 60 rotates the plane of polarization of the p-polarized light by substantially +45 degrees so that the plane of polarization of the light is parallel to the orientation of the linear polarizer 62. The second portion 32b is therefore transmitted through the linear polarizer 62 to the reflective element 64. The second portion of light 32b is reflected off of the reflective element 64 and back through the linear polarizer 62. The plane of polarization of the second portion of light 32b is rotated by the adjustable circular retarder 60 a second time by substantially +45 degrees and returned to the polarization beam splitter 38 along the second path 32b'. The plane of polarization of the second portion of light 32b is therefore rotated by substantially 90 degrees or from the p-polarized state to the s-polarized state. Because the polarization beam splitter 38 reflects light that is in the s-polarized state, the second portion of light 32b is reflected by the polarization beam splitter 38 to the focal plane 51.

The adjustable circular retarder 60 in the second optical assembly 52 controls the operational state of the polarimeter 30. For example, in the polarimeter mode, a first voltage is applied to the adjustable circular retarder 60 to rotate plane of polarization of the second portion of light 32b to be absorbed by the linear polarizer 62. A second voltage is applied to the adjustable circular retarder 60 to rotate the plane of polarization of the second portion of light 32b to be transmitted through the linear polarizer 62 and reflected by the polarization beam splitter 38 to the focal plane 51.

The polarimeter 30 is switchable between the polarimeter mode and the standard imager mode at any time by changing the voltage applied to the adjustable circular retarder 60. By applying a voltage to the second adjustable circular retarder, the light with the second polarization is either transmitted through the linear polarizer and reflected back to the polarization beam splitter (e.g., standard imaging mode) or absorbed by the linear polarizer (e.g., polarimeter mode). The application of a voltage to the second adjustable circular retarder, therefore, operates as a switch for changing the operational mode of the polarimeter. As will be appreciated, the application of the voltage to the second adjustable circular retarder can be controlled by a button, switch or an electrical controller, etc.

In standard imaging mode, the light at the focal plane 51 includes the first portion of light 32a and the second portion of light 32b, and therefore, the image at the focal plane 51 formed by the combined portion 66 of light is brighter in standard imaging mode than the image at the focal plane 51 in polarimeter mode. Although some of the incoming light 32 may be lost by transmitting the incoming light 32 through the polarization beam splitter 38, the brightness or intensity of the combined portion 66 of light at the focal plane 51 in standard imaging mode generally is brighter than the light 32a at the focal plane 51 in polarization mode.

As shown in FIGS. 3 and 4, the light that is reflected or transmitted to the focal plane passes through a focusing element 54 such that the light is focused on the focal plane 51.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A polarimeter comprising:
an adjustable circular retarder that receives incoming light and rotates the polarization of the incoming light;
a polarization beam splitter that polarizes the light received from the adjustable circular retarder by splitting the light into a first portion of light having a first polarization and a second portion of light having a second polarization, wherein the first portion of light is reflected by the polarization beam splitter along a first path and the second portion of light is transmitted through the polarization beam splitter along a second path;
a first optical assembly that receives the first portion of light, rotates the polarization by substantially 90 degrees, and directs the first portion of light back to the polarization beam splitter along the first path such that the first portion of light is transmitted through the polarization beam splitter to a focal plane; and
a second optical assembly that receives the second portion of light and selectively either (i) rotates the polarization by substantially 90 degrees and directs the second portion of light back to the polarization beam splitter along the second path such that the second portion of light with is reflected by the polarization beam splitter to the focal plane, or (ii) absorbs the second portion of light.

2. The polarimeter of claim 1, further comprising an afocal telescope that directs the incoming light to the adjustable circular retarder.

3. The polarimeter of claim 1, wherein the first optical assembly comprises a wave plate and a reflective element, wherein first portion of light passes through the wave plate to the reflective element, and the reflective element reflects the first portion of light back through the wave plate to the polarization beam splitter.

4. The polarimeter of claim 3, wherein the wave plate is a quarter wave plate.

5. The polarimeter of claim 1, wherein the second optical assembly comprises a second adjustable circular retarder and a linear polarizer, and the second portion of light passes through the second adjustable circular retarder which rotates the polarization of the second portion of light such that the linear polarizer absorbs the second portion of light.

6. The polarimeter of claim 5, wherein the second optical assembly is further comprised of a reflective element,
wherein the second portion of light passes through the second adjustable circular retarder which rotates the polarization of the second portion a first time so that the second portion of light is transmitted through the linear polarizer to the reflective element,
wherein the second portion of light is reflected by the reflective element back through the linear polarizer to the second adjustable circular retarder, and
wherein the second adjustable circular retarder rotates the polarization of the second portion of light a second time.

7. The polarimeter of claim 6, wherein the linear polarizer is a 45-degree linear polarizer and the second adjustable circular retarder either rotates the polarization of the second portion of light by −45 degrees such that the second portion of light is absorbed by the linear polarizer or rotates the polarization content of second portion of light by +45 degrees such that the second portion of light is transmitted through the linear polarizer.

8. The polarimeter of claim 1, wherein the second optical assembly includes a second adjustable circular retarder that is switchable between a first mode in which the second portion of light is rotated to be transmitted back to the polarization beam splitter and a second mode in which the second portion of light is rotated to be absorbed by a linear polarizer.

9. The polarimeter of claim 1, wherein the one of the first portion of light or the second portion of light is s-polarized light and the other of the first portion of light or the second portion of light is p-polarized light.

10. The polarimeter of claim 1, further comprising a focusing element that focuses the first portion of light and the second portion of light onto the focal plane.

11. A method of polarizing light with a polarimeter comprising,
receiving incoming light;
rotating the incoming light with an adjustable circular retarder;
polarizing the light with a polarization beam splitter by reflecting a first portion of light having a first polarization to a first optical assembly and transmitting a second portion of light having a second polarization through the polarization beam splitter to a second optical assembly;
rotating the polarization of the first portion of light and reflecting the first portion of light back to the polarization beam splitter with the first optical assembly such that the first portion of light is transmitted through the polarization beam splitter and directed to a focal plane; and
selectively operating the polarimeter in either (i) a first mode which comprises rotating the polarization of the second portion of light and reflecting the second portion of light back to the polarization beam splitter with the second optical assembly such that the second portion of light is reflected by the polarization beam splitter and directed to the focal plane, or (ii) a second mode which comprises absorbing the second portion of light with the second optical assembly.

12. The method of claim 11, further comprising introducing a π phase delay to the light having the first polarization with a first optical assembly.

13. The method of claim 12, wherein the introducing a π phase delay comprises:
transmitting the first portion of light through a quarter-wave plate to change an original linear polarization of first portion of light to circular polarization;
reflecting the light with the circular polarization off of a reflective element; and
transmitting the light with the circular polarization through the quarter-wave plate a second time to change the polarization to a linear polarization with a phase delay of π from the original linear polarization.

14. The method of claim 11, wherein the first mode further comprises rotating polarization of the first portion of light in a first direction by transmitting the light through a second adjustable circular retarder a first time, reflecting the first portion of light off of a reflective surface back to the second adjustable circular retarder, and rotating the first portion of light a second time in the first direction by transmitting the first portion of light through the second adjustable circular retarder a second time.

15. The method of claim 14, wherein the second mode further comprises rotating the polarization second portion of light in a second direction by transmitting the second portion of light through the second adjustable circular retarder.

16. The method of claim 15, wherein the first direction is orthogonal to the second direction.

17. The method of claim 15 wherein one of the first direction or the second direction is +45 degrees and the other of the first direction or the second direction is −45 degrees.

18. The method of claim 15, wherein rotating of the second portion of light with the second adjustable circular retarder comprises applying a first voltage to the second adjustable circular retarder to rotate the second portion of light in the first direction and applying a second voltage to the second adjustable circular retarder to rotate the second portion of light in the second direction.

19. The method of claim 14, wherein the selectively operating the polarimeter in the first mode and the second mode comprises applying a first voltage to the second adjustable circular retarder to operate the polarimeter in the first mode and a second voltage to the second adjustable circular retarder to operate the polarimeter in the second mode.

20. The method of claim 11, wherein the intensity of the light directed to the focal plane is greater when the polarimeter is operating in the first mode than the intensity of light directed to the focal plane when the polarimeter is operating in the second mode.

21. A switchable polarimeter comprising,
an optical assembly;
a first adjustable circular retarder that rotates the polarization content of incoming light;
a polarization beam splitter that receives light from the adjustable circular retarder and polarizes the light into light having a first polarization and light having a second polarization, wherein the light with the first polarization is directed to a focal plane and the light with the second polarization is directed to the optical assembly;
wherein the optical assembly is switchable between an imaging mode of operation in which the light with the first polarization and the light with the second polarization are viewable at the focal plane, and a polarizing mode of operation in which the light with the first polarization is viewable at the focal plane in absence of the light with the second polarization.

22. The switchable polarimeter of claim 21, wherein the optical assembly is comprised of a second adjustable circular retarder, a linear polarizer and a reflective element,
wherein the light with the second polarization is passed through the second adjustable circular retarder and is reflected off of the reflective element and back through the second adjustable circular retarder to the polarization beam splitter,
wherein the second adjustable circular retarder rotates the polarization content of the light to be reflected off of the mirror and to the focal plane in imaging mode and rotates the polarization content of the light to be absorbed by the linear polarizer in polarizing mode.

23. The switchable polarimeter of claim 22, wherein the second adjustable circular retarder rotates the polarization content of the light with the second polarization by +45 each time the light with the second polarization passes through the second adjustable circular retarder in imaging mode and rotates the polarization content of the light with the second polarization by −45 degrees in polarizing.

24. The switchable polarimeter of claim 21, wherein the intensity of light at the focal plane in imaging mode is greater than the intensity of light at the focal plane in the polarizing mode.

* * * * *